(12) United States Patent
Pikul et al.

(10) Patent No.: US 12,719,390 B2
(45) Date of Patent: Aug. 25, 2026

(54) PROGRAMMABLE SOFT ACTUATORS

(71) Applicant: The Trustees of the University of Pennsylvania, Philadelphia, PA (US)

(72) Inventors: James Henry Pikul, Philadelphia, PA (US); Gregory Campbell, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 202 days.

(21) Appl. No.: 18/320,327

(22) Filed: May 19, 2023

(65) Prior Publication Data

US 2023/0378891 A1 Nov. 23, 2023

Related U.S. Application Data

(60) Provisional application No. 63/344,248, filed on May 20, 2022.

(51) Int. Cl.
*H02N 13/00* (2006.01)
*B25J 15/00* (2006.01)

(52) U.S. Cl.
CPC .......... *H02N 13/00* (2013.01); *B25J 15/0085* (2013.01)

(58) Field of Classification Search
CPC ....... H02N 13/00; B25J 15/00; B25J 15/0085; B25J 9/142; B25J 15/0253; B25J 15/0293
USPC .......................................................... 361/234
See application file for complete search history.

(56) References Cited

U.S. PATENT DOCUMENTS

2007/0120444 A1* 5/2007 Kato ..................... F03G 7/0613 310/330
2011/0193362 A1* 8/2011 Prahlad .................... B25J 15/00 294/81.2
2013/0242455 A1* 9/2013 Prahlad ................ B25J 15/0009 361/234
2014/0104744 A1* 4/2014 Prahlad ................ B25J 15/0085 361/234
2019/0134826 A1* 5/2019 Hwang ................ B25J 15/0009
(Continued)

OTHER PUBLICATIONS

Alspach et al., "Soft-bubble: A highly compliant dense geometry tactile sensor for robot manipulation," in 2019 2nd IEEE International Conference on Soft Robotics (RoboSoft), IEEE, 2019, pp. 597-604.

(Continued)

*Primary Examiner* — Danny Nguyen
(74) *Attorney, Agent, or Firm* — BakerHostetler

(57) ABSTRACT

A soft actuator, comprising: a deformable member having a base stiffness; one or more electroadhesive (EA) clutches, the one or more EA clutches being in mechanical communication with the deformable member, and the one or more EA clutches being configured to, when actuated, give rise to a region of relative stiffness within the actuator that is greater than the base stiffness. A method, comprising: in a soft actuator, actuating one or more EA clutches in mechanical communication with a deformable member having a base stiffness, the actuating being performed so as to give rise to one or more regions of relative stiffness within the soft actuator that is greater than the base stiffness; and effecting a bending force within the deformable member such that the deformable member attains a shape, the shape at least partially defined by the actuated one or more EA clutches.

26 Claims, 18 Drawing Sheets

(56) References Cited

U.S. PATENT DOCUMENTS

| | | | | |
|---|---|---|---|---|
| 2020/0156237 | A1* | 5/2020 | Tang | B62D 57/02 |
| 2021/0316446 | A1* | 10/2021 | Leroy | G06F 3/014 |
| 2023/0091400 | A1* | 3/2023 | Acome | H02N 1/006 294/119.3 |
| 2024/0271668 | A1* | 8/2024 | Diller | F16D 28/00 |
| 2024/0379399 | A1* | 11/2024 | Saito | H02N 13/00 |

OTHER PUBLICATIONS

Balak and Y. C. Mazumdar, "Multi-modal pneumatic actuator for twisting, extension, and bending," in 2020 IEEE/RSJ International Conference on Intelligent Robots and Systems (IROS). IEEE, 2020, pp. 8673-8679.

Diller, C. Majidi, and S. H. Collins, "A lightweight, low-power electroadhesive clutch and spring for exoskeleton actuation," in 2016 IEEE International Conference on Robotics and Automation (ICRA). IEEE, 2016, pp. 682-689.

Diller, S. H. Collins, and C. Majidi, "The effects of electroadhesive clutch design parameters on performance characteristics," Journal ofIntelligent Material Systems and Structures, vol. 29, No. 19, pp. 3804-3828, 2018.

Firouzeh, M. Salerno, and J. Paik, "Soft pneumatic actuator with adjustable stiffness layers for multi-dof actuation," in 2015 IEEE/RSJ International Conference on Intelligent Robots and Systems (IROS). IEEE, 2015, pp. 1117-1124.

Germann, M. Dommer, R. Pericet-Camara, and D. Floreano, "Active connection mechanism for soft modular robots," Advanced Robotics, vol. 26, No. 7, pp. 785-798,2012.

Girardeau-Montaut, "Cloudcompare," France: EDF R&D Telecom ParisTech, 2016.

Guo, C. Xiang, and J. Rossiter, "A soft and shape-adaptive electroadhesive composite gripper with proprioceptive and exteroceptive capabilities," Materials & Design, vol. 156, pp. 586-587, 2018.

Hinchet and H. Shea, "High force density textile electrostatic clutch," Advanced Materials Technologies, vol. 5, No. 4, p. 1900895, 2020.

Hinchet, V. Vechev, H. Shea, and O. Hilliges, "Dextres: Wearable haptic feedback for grasping in vr via a thin form-factor electrostatic brake," in Proceedings of the 31st Annual ACM Symposium on User Interface Software and Technology, 2018, pp. 901-912.

Imamura, K. Kadooka, and M. Taya, "A variable stiffness dielectric elastomer actuator based on electrostatic chucking," Soft matter, vol. 13, No. 18, pp. 3440-3448, 2017.

Laschi, B. Mazzolai, and M. Cianchetti, "Soft robotics: Technologies and systems pushing the boundaries ofrobot abilities," Sci. Robot, vol. 1, No. 1, p. eaah3690, 2016.

Levine, K. T. Turner, and J. H. Pikul, "Materials with electroprogrammable stiffness," Advanced Materials, p. 2007952, 2021.

Mosadegh, P. Polygerinos, C. Keplinger, S. Wennstedt, R. F. Shepherd, U. Gupta, J. Shim, K. Bertoldi, C. J. Walsh, and G. M. White-sides, "Pneumatic networks for soft robotics that actuate rapidly," Advanced functional materials, vol. 24, No. 15, pp. 2163-2170, 2014.

Pettersson, S. Davis, J. O. Gray, T. J. Dodd, and T. Ohlsson, Design of a magnetorheological robot gripper for handling of delicate food products with varying shapes, Journal of Food Engineering, vol. 98, No. 3, pp. 332-338, 2010.

Pikul, S. Li, H. Bai, R. Hanlon, I. Cohen, and R. Shepherd, CC Stretchable surfaces with programmable 3d texture morphing for synthetic camouflaging skins, Science, vol. 358, No. 6360, pp. 210-214, 2017.

Robinson and J. B. C. Davies, Continuum robots—a state of the art, in Proceedings 1999 IEEE international conference on robotics and automation (Cat. No. 99CH36288C), vol. 4. IEEE, 1999, pp. 2849-2854.

Shepherd, F. Ilievski, W. Choi, S. A. Morin, A. A. Stokes, A. D. Mazzeo, X. Chen, M. Wang, and G. M. Whitesides, "Multigait soft robot," Proceedings of the national academy of sciences, vol. 108, No. 51, pp. 20 400-20 403, 2011.

Sholl, A. Moss, M. Krieg, and K. Mohseni, "Controlling the deformation space ofsoft membranes using fiber reinforcement," The International Journal of Robotics Research, vol. 40, No. 1, pp. 178-196, 2021.

Steltz, A. Mozeika, N. Rodenberg, E. Brown, and H. M. Jaeger, Jsel: Jamming skin enabled locomotion, in 2009 IEEE/RSJ Interna-tional Conference on Intelligent Robots and Systems. IEEE, 2009, pp. 5672-5677.

Systemes, "Abaqus," https://www.3ds.com/productsservices/simulia/products/abaqus/, 2020/Standard, Retreived on Jun. 18, 2023.

Tolley Michael, F. Shepherd Robert, C. Galloway Kevin, [0074] J. Wood Robert, M. Whitesides George et al., "A resilient, untethered soft robot," Soft robotics, 2014.

Toolkit, "Demo 1: Multi-chamber bending spa," https://softroboticstoolkit.com/book/modeling-soft-pneumatic-actuators/modeling/demo-1; Retreived on Jun. 18, 2023.

Yin, R. Hinchet, H. Shea, and C. Majidi, "Wearable soft technologies for haptic sensing and feedback," Advanced Functional Materials, p. 2007428, 2020.

Zou, T. Li, S. Qu, and H. Yu, "Active Shape Control and Phase Coexistence ofDielectric Elastomer Membrane With Patterned Electrodes," Journal of Applied Mechanics, vol. 81, No. 3, 10 2013, 031016. [Online]. Available: https://doi.org/10.1115/L4025416.

* cited by examiner

FIG. 2Cii

PROGRAMMABLE SOFT ACTUATORS

CROSS-REFERENCE TO RELATED APPLICATIONS

This application claims the benefit of and priority to U.S. Provisional Application No. 63/344,248, "Programmable Soft Actuators" (filed May 20, 2022), the entirety of which application is incorporated by reference herein for any and all purposes.

GOVERNMENT RIGHTS

This invention was made with government support under 1935294 awarded by the National Science Foundation. The government has certain rights in the invention.

TECHNICAL FIELD

The present disclosure relates to the field of soft robotics and also to the field of electroadhesive (EA) clutches.

BACKGROUND

Soft robotic actuators are safe and adaptable devices with inherent compliance, which makes them attractive for manipulating delicate and complex objects. Researchers have integrated stiff materials into soft actuators to increase their force capacity and direct their deformation. However, these embedded materials have largely been pre-prescribed and static, which constrains the actuators to a predetermined range of motion. Accordingly, there is a long-felt need in the art for dynamic soft actuators and related methods.

SUMMARY

In meeting the described long-felt needs, the present disclosure first provides a soft actuator, comprising: a deformable member having a base stiffness; one or more electroadhesive (EA) clutches, the one or more EA clutches being in mechanical communication with the deformable member, and the one or more EA clutches being configured to, when actuated, give rise to a region of relative stiffness within the actuator that is greater than the base stiffness.

Also provided is a method, comprising operating a soft actuator according to the present disclosure, for example according to any one of Aspects 1-14.

Further disclosed is a method, comprising: in a soft actuator, actuating one or more EA clutches in mechanical communication with a deformable member having a base stiffness, the actuating being performed so as to give rise to one or more regions of relative stiffness within the soft actuator that is greater than the base stiffness; and effecting a bending force within the deformable member such that the deformable member attains a shape, the shape at least partially defined by the actuated one or more EA clutches.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIG. 1A. Actuator expansion formed into three different shapes; shape chosen by clutch activation. Top-view presented over side-view. FIG. 1B. Expansion of soft, elastomeric actuator to 3.1 kPa under three different clutch activation configurations. FIG. 1C. Soft actuator manipulation of 3.7 g ball. FIG. 1D. Manipulation of 820 g textbook.

FIG. 2A. Overview of actuator test system with labels. FIG. 2B. Model of silicone membrane with clutch locations superimposed. Model includes stiff silicone reinforced with fabric, soft unsupported silicone, four outboard clutches, and one inboard clutch. FIGS. 2Ci-Cii. Clutch is highlighted with yellow. FIG. 2Ci) Outboard clutch is activated and restricts membrane expansion. FIG. 2Cii) Outboard clutch is deactivated and membrane is free to expand.

FIG. 4A. Plateau shape. FIG. 4B. Round shape. FIG. 4C. Pyramidal shape.

FIG. 5A. Plot of actuator workspace along 4 degrees of freedom (DoF), looking at the actuator from a top-down view. Each DoF is accessed by activating a different set of clutches. Photos of corresponding ball positions. FIG. 5B. Plot that tracks position of ball once it has been placed on the actuator. The actuator lifts it to the specified direction and then releases the clutch(es) to rapidly apply force to the ball in the desired direction. Photos of corresponding projectile motion. FIG. 5C. Labeled photo of actuator with directions and DoFs.

FIG. 6A. Textbook lifted and tilted by pneumatic inflation to 3.1 kPa during right clutch activation. FIG. 6B. Textbook returned from tilt by clutch deactivation. FIG. 6C. Vicon data for textbook roll angle response to inflation under clutch activation and to clutch deactivation.

DETAILED DESCRIPTION OF ILLUSTRATIVE EMBODIMENTS

Figure 1A:
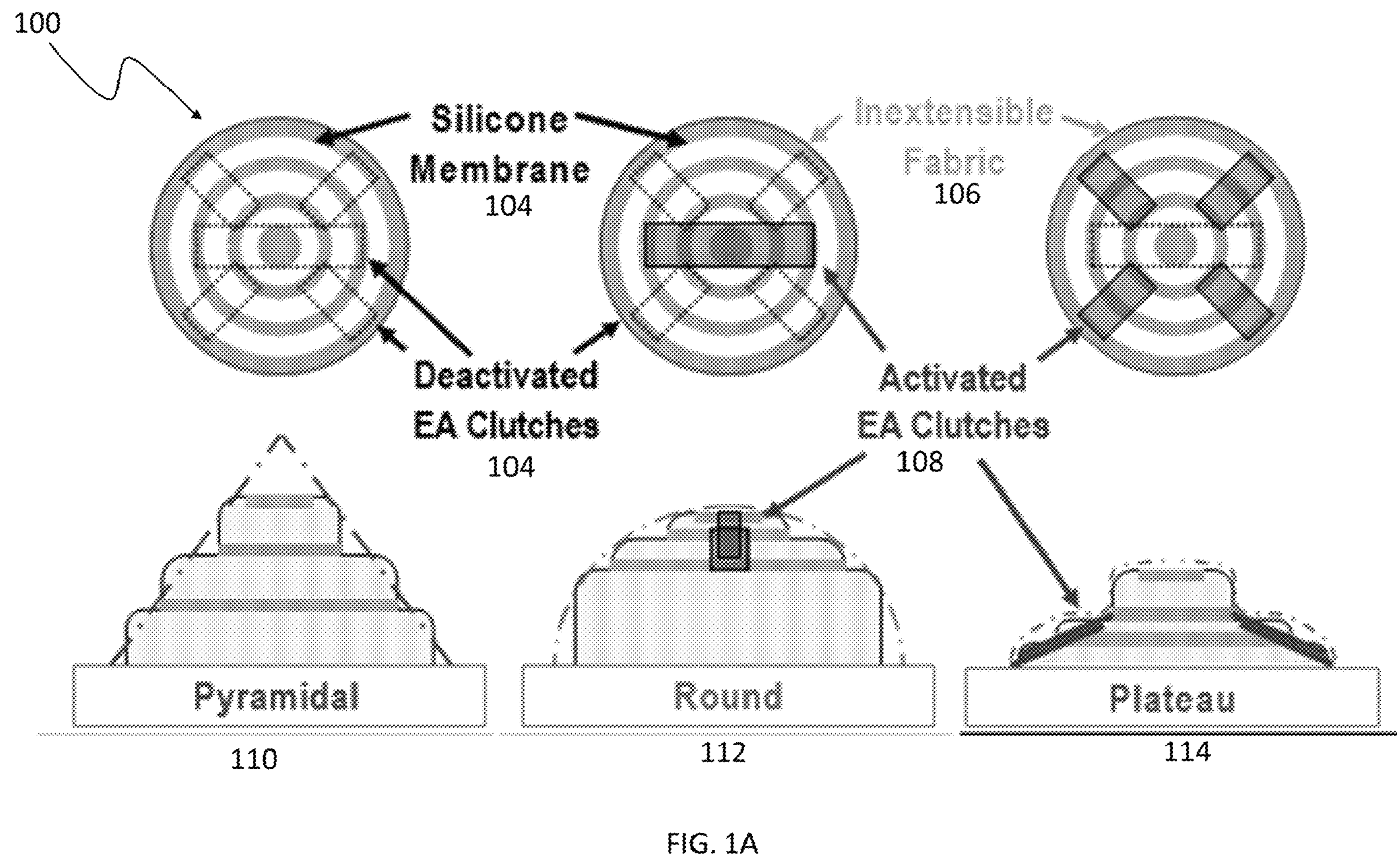
FIGS. 1A-1D.
Figure 1B:
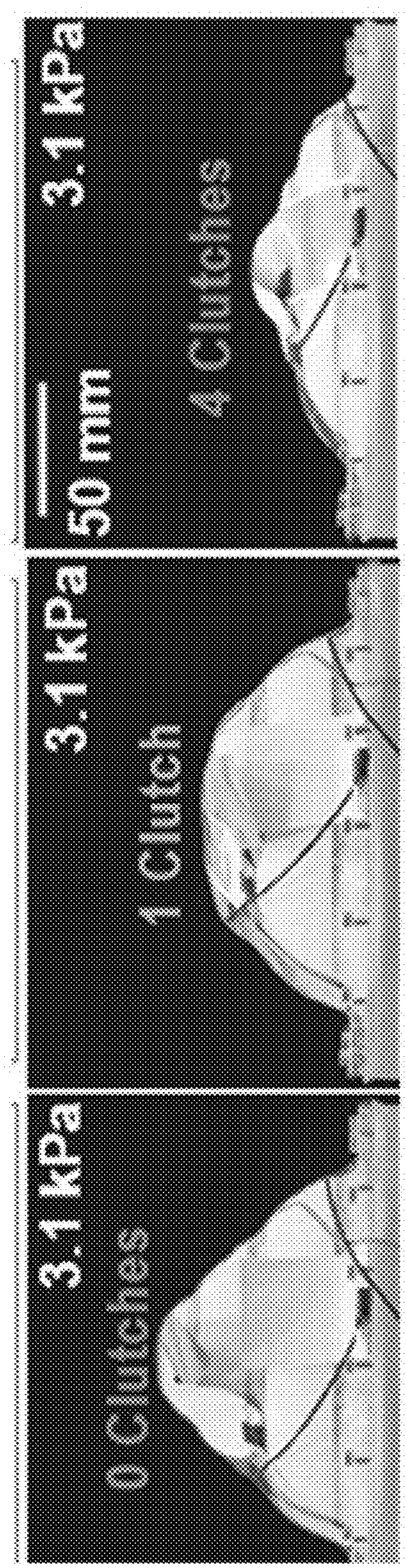

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints. The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only.

Any documents cited herein are incorporated by reference in their entireties for any and all purposes.

Soft robotic actuators are safe and adaptable devices with inherent compliance, which makes them attractive for manipulating delicate and complex objects. Researchers have integrated stiff materials into soft actuators to increase their force capacity and direct their deformation. However, these embedded materials have largely been pre-prescribed and static, which constrains the actuators to a predetermined range of motion.

As a non-limiting illustration of the disclosed technology, electroadhesive (EA) clutches integrated on a single-chamber soft pneumatic actuator (SPA) provide local programmable stiffness modulation to control the actuator deformation. One can show that activating different clutch patterns (for example, according to a preprogrammed schedule) inflates a silicone membrane into pyramidal, round, and plateau shapes. Curvatures from these shapes are combined during actuation to apply forces on both a 3.7 g and 820 g object along five different degrees of freedom (DoF). The actuator workspace is up to 12 mm for light objects. Clutch deactivation, which results in local elastomeric expansion, rapidly applies forces up to 3.2 N to an object resting on the surface and launches a 3.7 g object in controlled directions. The actuator also rotates a heavier, 820 g, object by 5 degrees and rapidly restores it to horizontal alignment after clutch deactivation. This actuator is fully powered by a 5 V battery, AA battery, DC-DC transformer, and 4.5 V (63 g) DC air pump. These results demonstrate a first step towards realizing a soft actuator with high DoF shape change that preserves the inherent benefits of pneumatic actuation while gaining the electrical controllability and strength of EA clutches.

Soft robotic actuators use elastic deformation to produce smooth, continuous motions [1] and conform to delicate objects [2] while remaining resilient to adverse environmental conditions or critical loading [3]. Soft materials are also generally inexpensive, light, and easily compactable for storage or transportation. These properties make soft actuators useful across a variety of applications including locomotion, gripping, manipulation, and haptic response [4], [5].

Most soft pneumatic actuators are constrained to deform along a single determined range of motion due to the static nature of their material composition. These single-configuration soft pneumatic actuators (SPA) are fundamentally limited in their ability to controllably adapt to new shapes, actuation modes, and forces. SPAs are typically made from pressurized chambers or "pneu-nets" in elastomers, which control the scale or speed of material expansion [6], [7], while also having passive inextensible materials, such as fabric [8] or fibers [9], to restrict expansion towards a single desired range of motion. If an alternative range of motion is desired, an entirely new actuator must be manufactured. Achieving general 3-dimensional motion control with this type of SPA necessitates the use of multiple separate chambers working in tandem [6], [10]. These SPAs therefore require multiple pressure sources and rely on rigid peripherals for electrical controllability across multiple degrees of freedom (DoF). An alternative approach is to actively program the stiffness of materials in soft actuators and, therefore, allow the range of motion to be modulated in real time with a single source of pressurized fluid.

Active stiffness modulation of soft materials has been explored with technologies such as granular jamming [11] and joule heating [12], both of which rely on long transition times (multiple seconds). Faster, electrostatic solutions have also been realized [13], including dielectric elastomer actuators (DEA), which align opposite charges around a dielectric elastomer to reduce its thickness and increase its area. Electrostatic chucking [14]stacks many layers of DEAs to increase stiffness, while DEA membranes [15] use the DEA to decrease their already low stiffness. Electroadhesive (EA) clutches are an attractive alternative because they have been shown to modulate stiffness in tens of milliseconds while applying stresses over 8 N/cm$^2$ at 400V [16]-[18]. EA clutches apply opposite electric charge on two parallel pads, which are then adhered to each other and prevent relative motion. EA pads have been used to modulate stiffness for restricting human motion [16], [19] and in soft robots to assist with grasping [20] or modulate physical connections [21].

This work demonstrates the use of EA clutches to provide stiffness modulation and shape control for a single-chamber soft pneumatic actuator. By attaching clutches to a membrane and alternating which clutches are activated, one can demonstrate the ability to vary stiffness and inflate into multiple shapes and curvatures. These curvatures are primitives for a broader set of complex shapes, as previously demonstrated for camouflage applications [8]. One can demonstrate the versatility of this electrical stiffness control in two modes of actuation along five DoF: expansion-driven manipulation of a 3.7 g object and passively stable manipulation of a 820 g object. One can use manipulation of a 3.7 g object to characterize the actuator workspace, up to 12 mm along the five DoF, and to assess the magnitude and consistency of force applied by local membrane expansion caused by deactivating a clutch, up to 3.2 N. The actuator also tilts a 820 g object by 5 degrees via pneumatic inflation with clutch activation and rapidly repositions it via clutch deactivation. Using clutch deactivation instead of pressure increase to rapidly apply force allows this actuator to function untethered, with a small (4.5 V, 63 g) air pump supplying pressure and one 5 V and one AA battery as energy sources.

This work provides a usage of EA clutches for soft actuator stiffness modulation and the first instance of real-time electrically-controllable soft membrane stiffness modulation for pneumatic force application. The actuator presented is mobile and versatile, providing both speed and strength. This work presents scalable, real-time variable, and broadly applicable soft actuators that achieve high strain and electrically-controllable actuation.

Figure 1C:
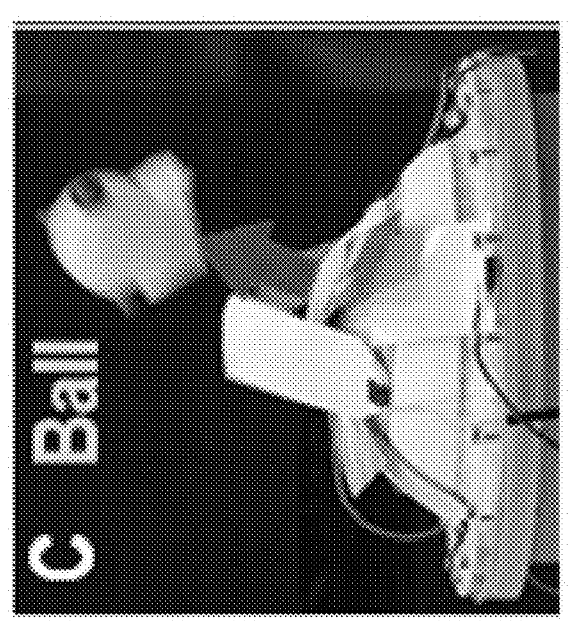
Figure 1D:

FIGS. 1A-1D provide examples of the disclosed technology. As shown in FIG. 1, a soft actuator 100 according to the present disclosure can include a membrane 104 (which can be, for example, a silicon membrane). As shown in the left panel of FIG. 1A, such an actuator can define a pyramidal shape 110 when EA clutches 104 are in a deactivated state. By activating a central EA clutch (108) and leaving perimeter clutches in a deactivated state, the actuator can achieve a round profile 112; as shown the central clutch acts to encourage the tip of the pyramid downward. By activating perimeter EA clutches (108), the soft actuator can achieve a plateau profile 114, as the perimeter clutches act to encourage the perimeter region of the actuator downward. This is further illustrated by FIG. 1B, which figure illustrates the soft actuator converting between the pyramidal (left) state, the rounded (middle) state in which one clutch is active, and the plateau (right) state in which 4 clutches are active. FIG. 1C provides an image of a ball being encouraged off of a soft actuator according to the present disclosure; this can be accomplished by deactivating a clutch (or a plurality of clutches) such that the soft actuator returns to an initial shape (pyramidal, for example), with that return to the initial shape acting to encourage an object off of the soft actuator. Such encouragement can be in the manner of a catapult, for example. FIG. 1D illustrates how activating a clutch (or clutches) of a soft actuator according to the present actuator can effect a change in angle of an object disposed on the actuator or otherwise coupled to the actuator.

Figure 2A:
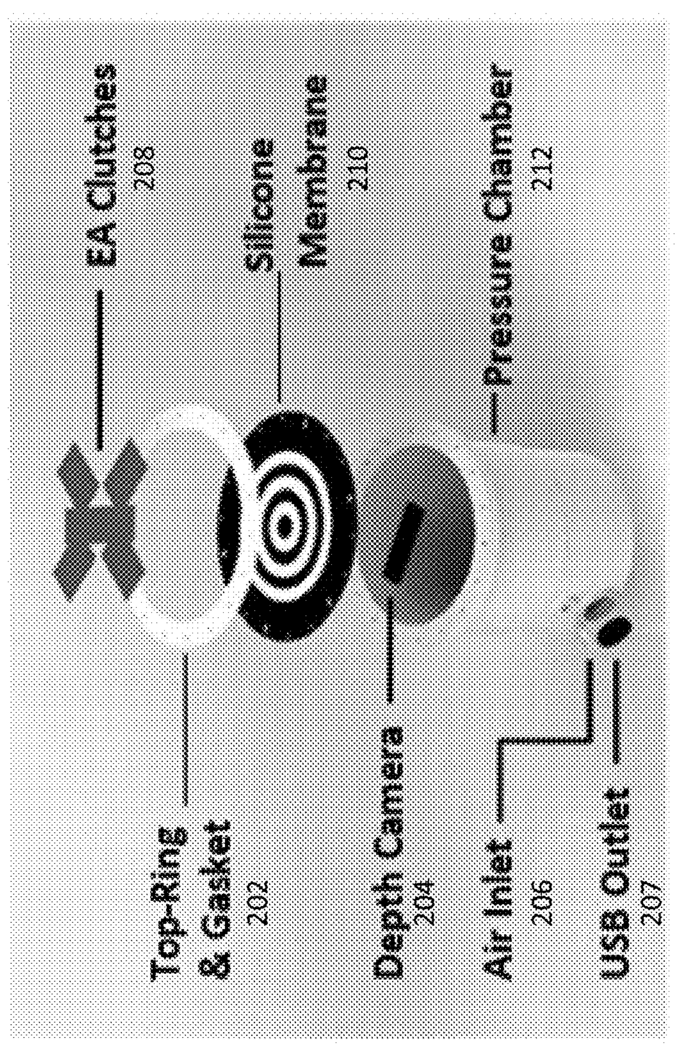
FIGS. 2A-2Cii.

An example soft membrane system (FIG. 2A) includes various components: 1) a pressurized chamber, 2) the elastomeric membrane with EA clutches, and 3) sensors and control electronics. Such a system can be used as a testing system.

As shown, such a system can include, for example, a top ring and gasket 202, a depth camera 204, an air inlet 206, a USB connection 207, one or more EA clutches 208, a membrane 210, and a pressure chamber 212.

Soft Membrane Test System—Chamber

A pressurized chamber can be assembled from two 3D-printed pieces. Both pieces are glued together using a resin epoxy adhesive. The chamber has two ports: an air inlet via a push-to-connect tube fitting and a dual USB 3.0 port for sensor data output. Both ports are sealed with silicone gaskets and resin epoxy adhesive. The elastomeric membrane can be clamped down at the top of the chamber with a silicone gasket, laser-cut acrylic ring, and screws. The inner diameter of the top ring restricts the area of the actuator that can expand to a diameter of 150 mm.

Elastomeric Membrane and Electroadhesive (EA) Clutches

To make the Ecoflex 00-30 membrane, one can laser-cut Soft N' Shear fabric stabilizer and place it in the Ecoflex during curing to provide areas of high stiffness. One can then connect EA clutches to these fabric-reinforced areas via Sil-Poxy silicone adhesive. One can apply clutches only onto areas reinforced by Soft N' Shear due to Sil-Poxy's relatively high stiffness.

Figure 2B:
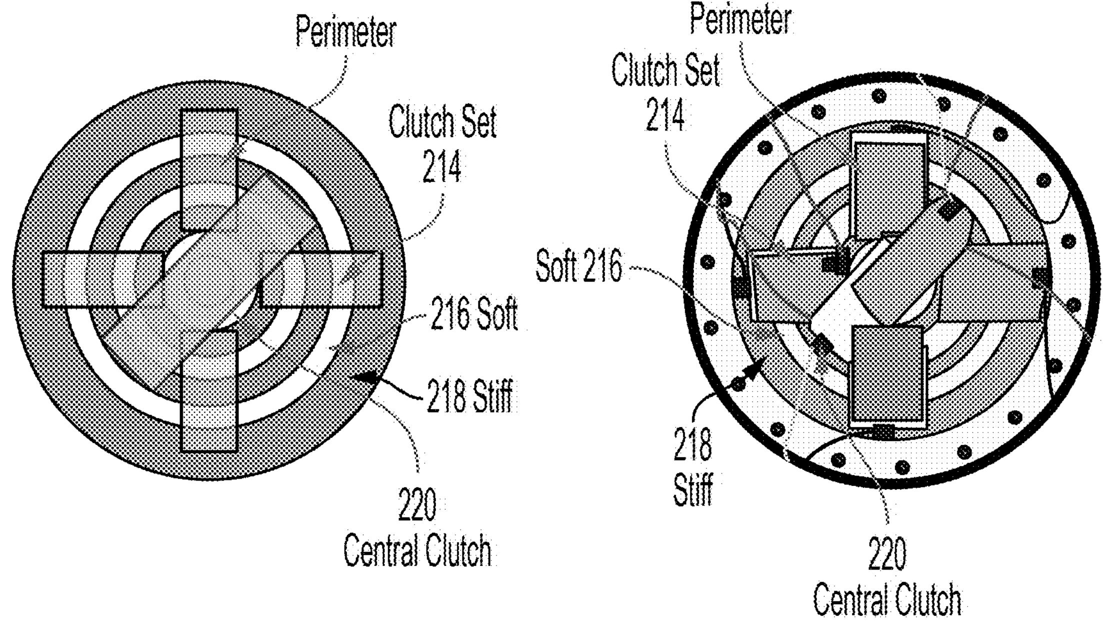
Figure 2C:
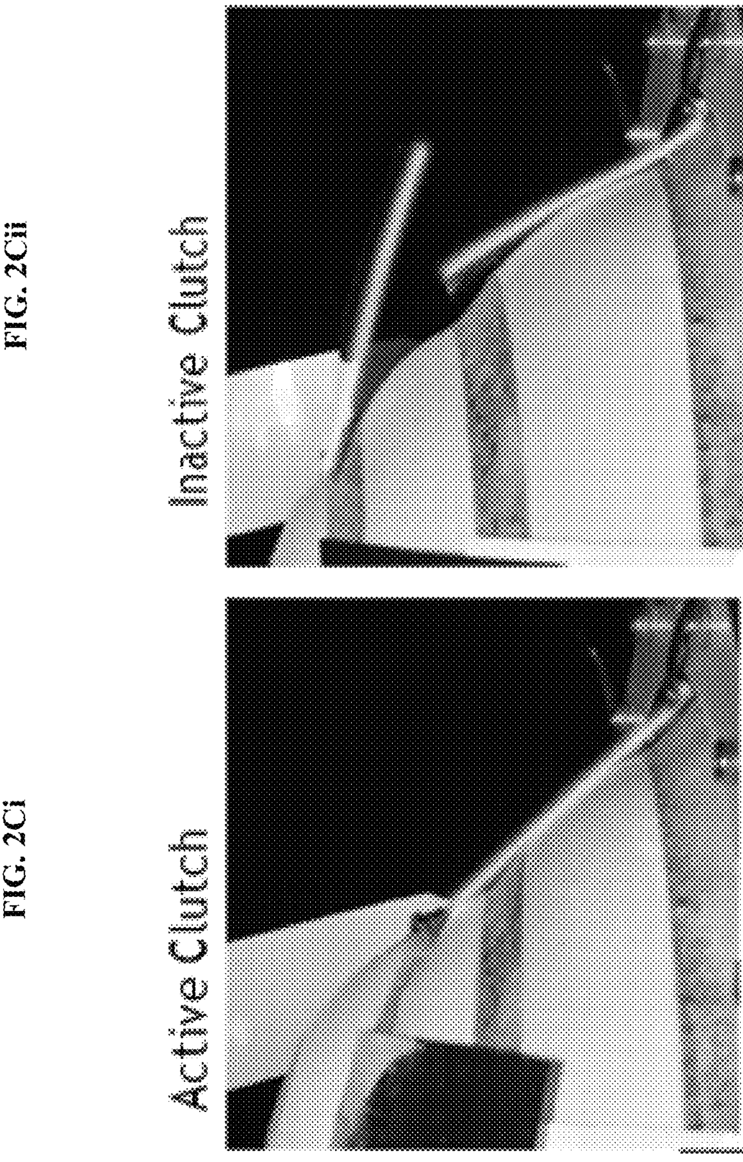

The Soft N' Shear stiff regions were designed such that specific antagonistic forces create varied curvatures. The chosen layout is based off the zero Gaussian curvature layout from [8]. The concentric rings create a pyramidal shape upon inflation, as long as they are sufficiently close together. One can space the rings such that there is a large enough stiffened region for adhering the EA clutch plates. One can create three concentric regions of unstiffened silicone (FIG. 2B) and control the activation of EA clutches such that the clutches restrict the expansion of some subset of these three soft regions (FIGS. 2Ci-2Cii). One can, for example, link multiple clutches together in parallel to activate at the same time, which allows for pre-determined patterns to activate with a single signal. For the shape change configuration (FIG. 2B) the red, outboard, clutches are activated by one signal, while the green, inboard, clutch is activated by another.

The EA clutches use Dupont Luxprint 8153 as a dielectric. The parameters of Luxprint clutches are well characterized [18] and provide sufficiently high forces at hundreds of volts relative to other dielectric options [16], [23]. Following the fabrication process specified by Diller et al. [18], the Luxprint was layered to nominally 50 μm (actual thickness varies from 40-50 μm) with a Gardco AP-1/4X10 wet film applicator rod on a nominally 50 μm thick aluminum-sputtered biaxially-oriented polyethylene terephthalate (BOPET) and baked to cure at 250° F. for 30 minutes, rested at room temperature for 30 minutes, and then baked again at 250° F. for 30 minutes. The resulting sheets were cut with a Cricut Explore Air 2 into desired shapes and fit with wires, which were attached to the aluminum on the BOPET via MG Silver Epoxy 8331. Electrical tape provides electrical insulation over wire leads and prevents delamination of the cured 8331 Epoxy from the aluminum on the BOPET. Clutches are activated at a DC voltage of approximately 420 V.

Electronics

The pressure chamber houses an air pressure sensor (Qwiic MicroPressure Sensor; Sparkfun), ESP32 microcontroller, and a time-of-flight depth camera (Picoflexx; PMD). The air pressure sensor monitors the internal air pressure and connects to the microcontroller to output data through the USB port. The depth camera captures membrane deformation data by measuring the displacements of the membrane from inside the chamber, and also passes data through the USB port.

Figure 3:
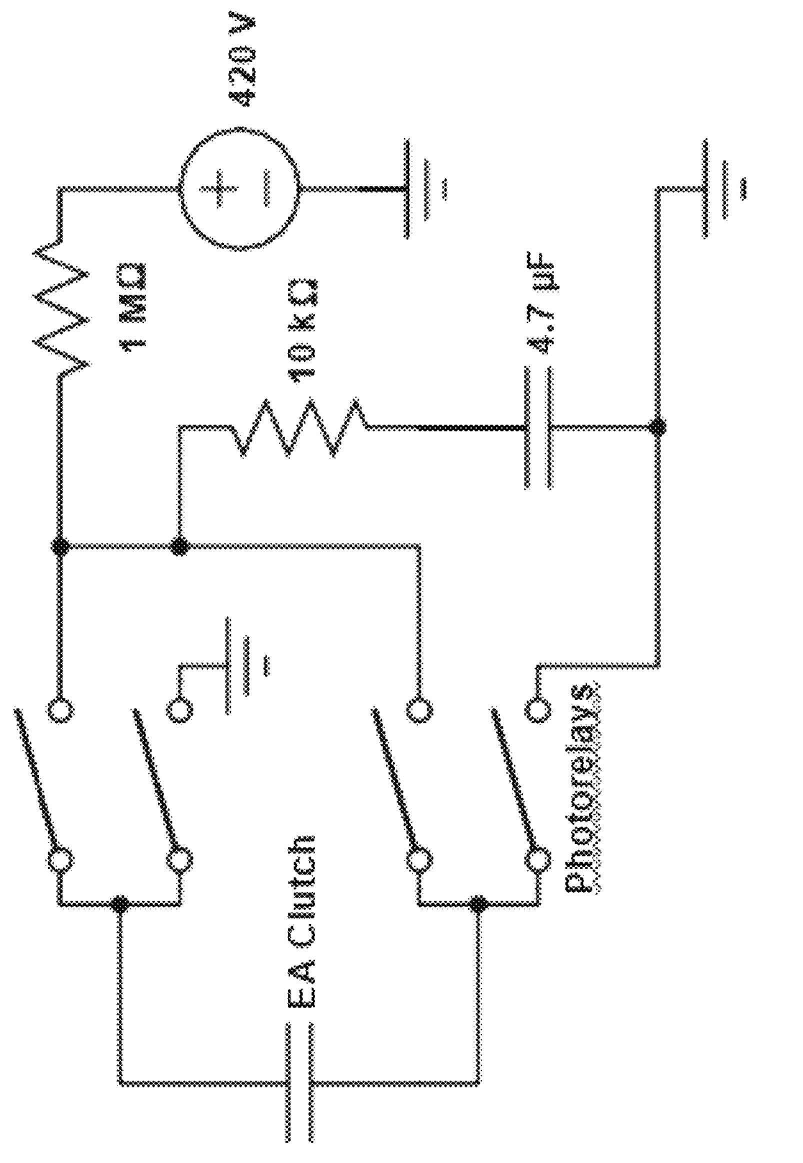
FIG. 3. Non-limiting clutch circuit diagram.

External to the pressure chamber was a ZR370-02PM 4.5 V DC air pump and vacuum (dimensions: 58×27×27 mm, mass: 63 g) powered by a 5 V battery applies air pressure. The electronic clutch control circuit (FIG. 3) includes TLP222G-2 photorelays which switch to bring one clutch plate to the high (~420 V) voltage [18]. 4.7 μF, 400 V capacitors supply additional current in parallel with the high voltage supply during activation transitions. Using two relays allows each clutch to switch polarity. Switching polarity between tests counteracts space-charge effects, which enables reliable deactivation. This circuitry was scaled up to allow for the simultaneous or subsequent activation of multiple clutches. An ESP32 microcontroller controls inflation and clutch (de)activation with inputs from a laptop computer. Similarly, the laptop records pressure data and depth images. An EMCO F101CT DC/DC converter connected to a AA battery supplies power for the clutches.

Example Results

Finite Element Modeling

The finite element (FE) package ABAQUS 2020/Standard [24] was used to understand how an inflatable structure behaved under different clutch constraints. In this analysis, one can model the silicone inflatable structure as a circular shell discretized into S4R element types. The thickness of the silicone shell and the attached clutches match the experimental setup at 1 mm and 0.2 mm, respectively.

Pneumatic pressure was applied normal of the top surface of the membrane, while the edge of the structure is fixed with a zero-displacement constraint in all 6 DoF. Based on the membrane design, each portion of the ring was assigned to either Ecoflex 00-30 or Soft N' Shear fabric stabilizer (high stiffness).

One can model the Ecoflex's hyperelastic behavior using a 3-term Ogden model [25], Soft N' Shear areas using elastic material with a modulus of 8 MPa, and the clutch, including the two individual clutch plates and adhesive connections, using elastic material with a modulus of 100 MPa. The clutch is attached with bonding to the membrane over the entirety of the regions marked in FIG. 2B. This differs from the experimental system, in which the clutches bond to the membrane only at the ends. The simulation runs dynamically, without mass scaling. The output displacement contour provides position values. As shown in the top-down view of FIG. 2B, an assembly can include regions of relative softness (216) and relative stiffness (218), as well as a central clutch 220 and perimeter clutches 214.

Figure 4A:
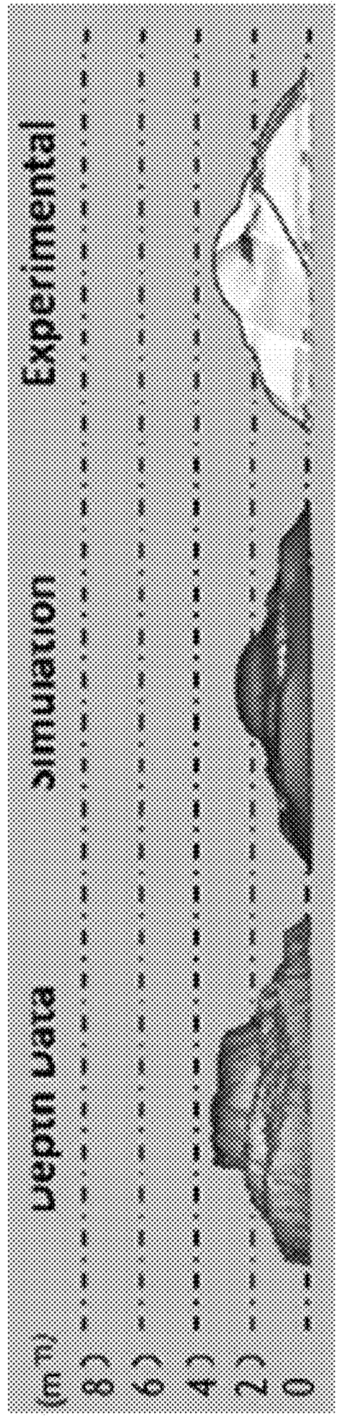
FIGS. 4A-4C. Depth camera data (left), simulation (center), and experimental system (right) for actuator shape comparison.
Figure 4B:
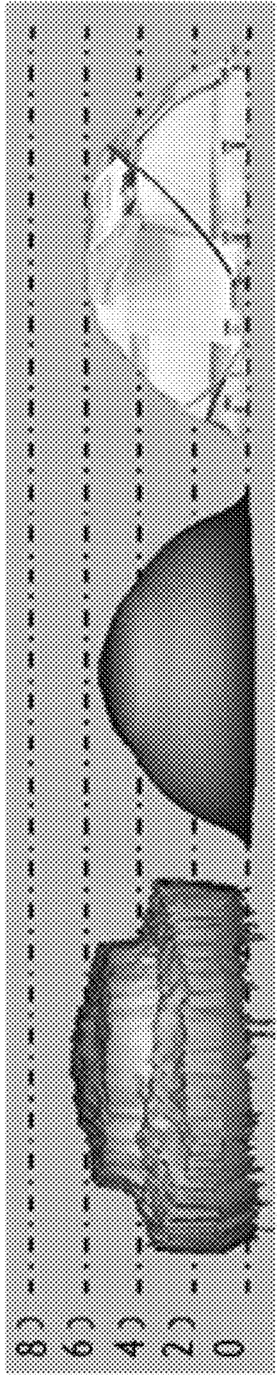
Figure 4C:
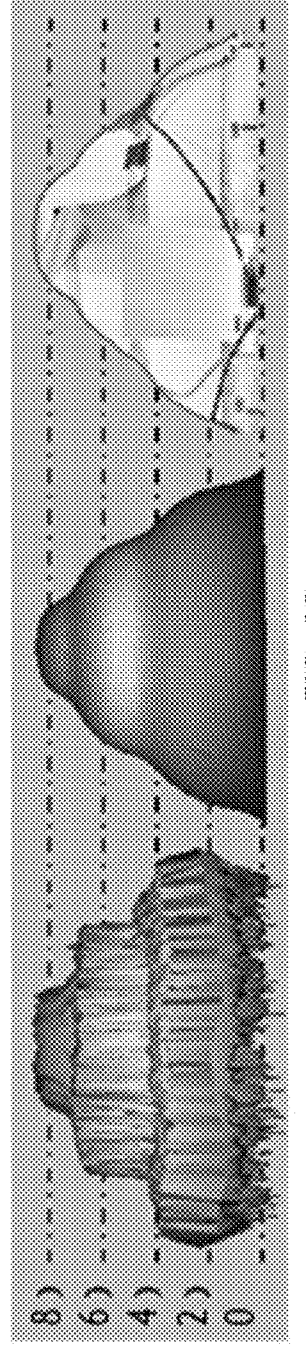

The modeling predicts that thin clutches can provide significant change in membrane inflation shape when inflated to 3.1 kPa (gauge pressure), as seen in the center column of FIG. 4. Four thin clutches are positioned in the outboard positions for FIG. 4A, one clutch is positioned at the inboard position for FIG. 4B, and the stabilized silicone is simulated without any clutches in FIG. 4C. The maximum height the membrane reaches for each simulation respectively is: 26.5 mm, 57.1 mm, and 86.3 mm.

Experimental Results

The left column of FIG. 4 shows the time-of-flight depth data of the membrane as one inflates it to ~3.1 kPa with three different clutch configurations. Prior to and throughout inflation to the plateau shape (FIG. 4A), one can apply the voltage difference of ~420 V across the four outboard clutches (red rectangles in FIG. 2B), restricting the expansion of the two outboard rings of unsupported silicone. The resulting expansion therefore occurs primarily at the innermost ring of silicone, leading to a height of 32.7 mm. Prior to and throughout inflating to the membrane to the round shape (FIG. 4B), only the interior clutch was activated. Expansion therefore occurs mostly in the outer-most ring of unsupported silicone. When fully inflated, the membrane reaches a height of 66.7 mm. No clutches were activated for the pyramidal shape (FIG. 4C), leading to an inflation height of 86.3 mm.

To compare the experimental and simulation results, one can align the point clouds using the Iterative Closest Point algorithm and calculated the average root-mean squared error (RMSE) for each shape with CloudCompare [26]. One can use standard point cloud pre-processing techniques on the experimental data, including statistical outlier removal and the k-Nearest Neighbor noise filter. Average RMSE for the plateau, round, and pyramidal shapes respectively were 4.4 mm, 6.1 mm, and 6.3 mm.

Actuation

Figure 5A:
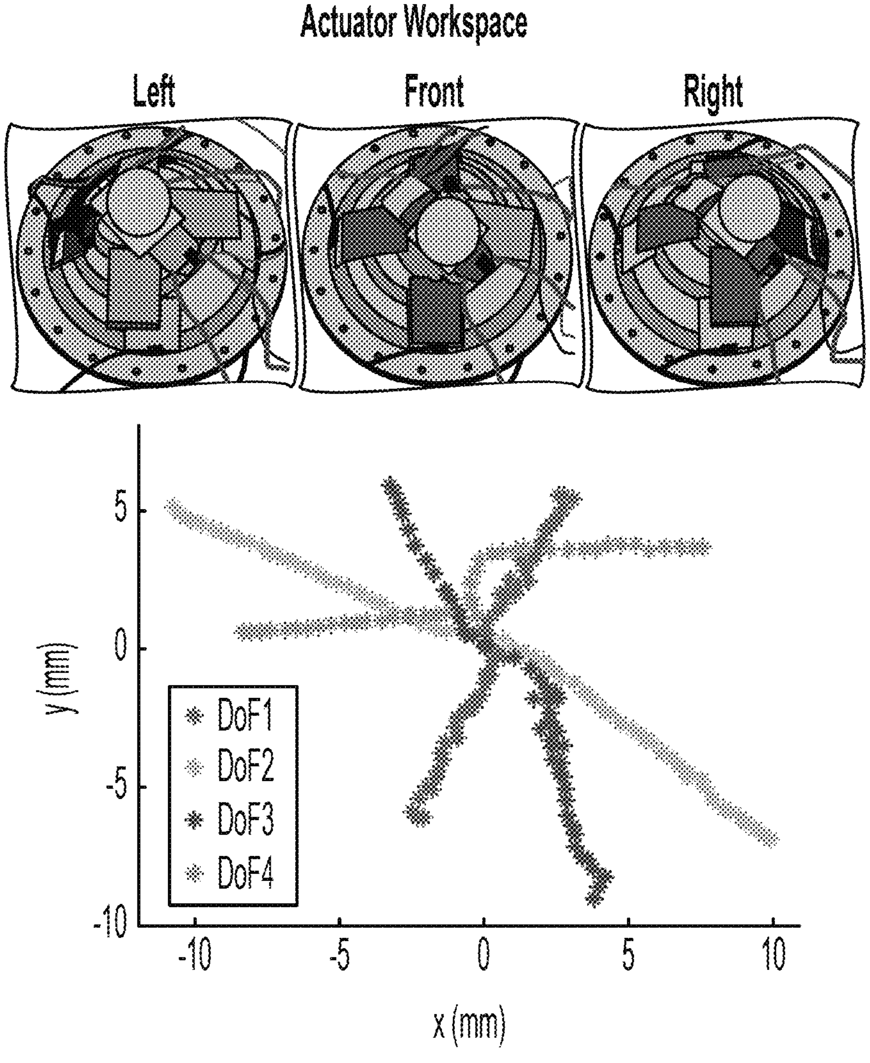
FIGS. 5A-5C.
Figure 5B:
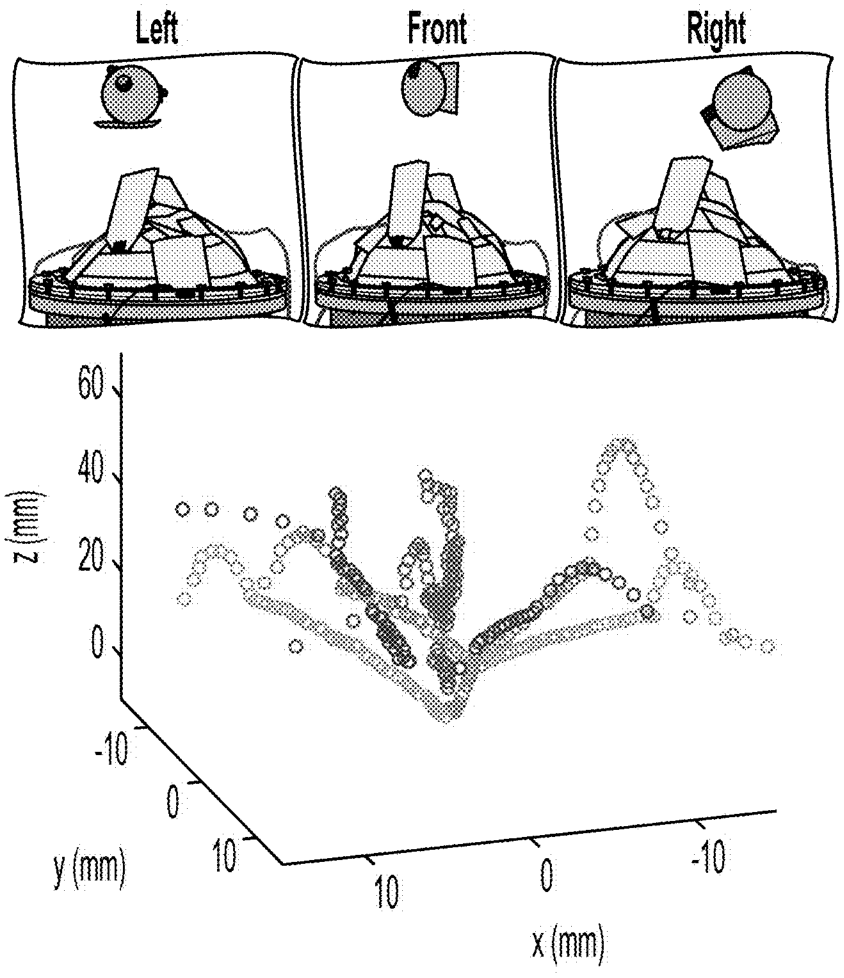
Figure 5C:
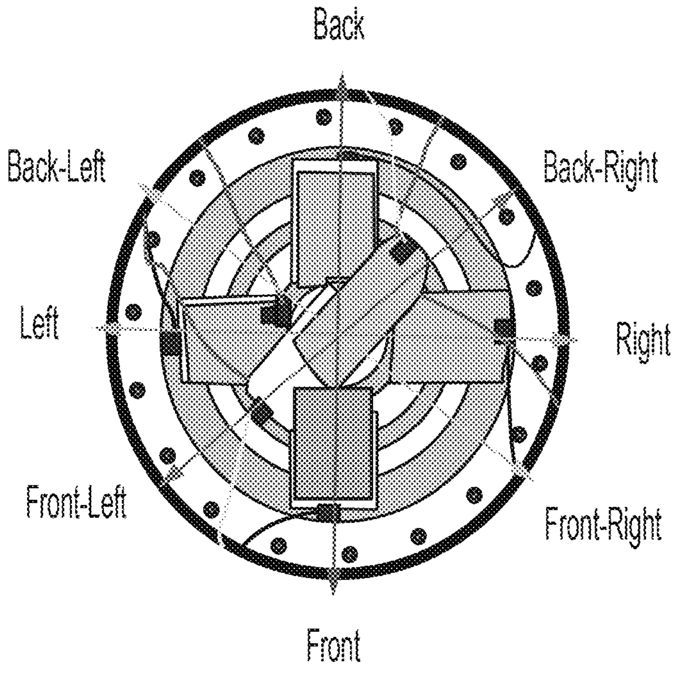
Figure 6C:
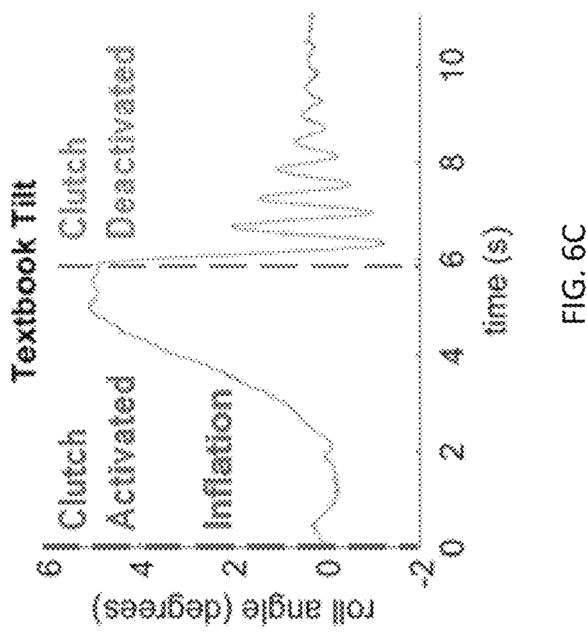
FIGS. 6A-6C.

One can leverage the shape-changing characteristics of this membrane into two separate modes of actuation, exemplified in FIG. 5 and FIG. 6 respectively. Mode 1 allows for shape restriction via the outboard clutches and the inboard clutch. One can activate clutches relevant to the desired motion at the start of inflation, and after inflation is complete, one can deactivate the inboard clutch to apply a rapid force in the desired direction. In Mode 1, one can position a light payload (ping pong ball with Vicon markers and yellow paper attached to bottom to keep it from rolling on membrane—mass: 3.7 g) along one of five different DoF. One can then use inboard clutch deactivation to rapidly "soften" the area of actuator directly under the object. This leads to a rapid expansion of the elastomer, which applies a force on the object in a direction corresponding to the actuator shape.

For heavier objects, specifically when the weight being manipulated is greater than the pressure force behind the inboard clutch, deactivating this clutch no longer provides sufficient force to displace the object. In these instances, the actuator operates in a second mode, Mode 2, which takes advantage of the increased friction force between the object and membrane that scales linearly with object weight. The additional weight also causes membrane deformation, which provides a larger contact area to support the object. In Mode 2, one can activate the desired outboard clutch(es) prior to inflation, which causes a tilt during the object lift. Subsequent to inflation, deactivating outboard clutches provides a rapid actuator shape change. With sufficient friction and contact area between the actuator and object, this leads to a rapid manipulation of the object. One can use Mode 2 to lift a much heavier payload (textbook with Vicon markers—mass: 820 g) into an angled position and return it to planar with outboard clutch deactivation.

Mode 1: Mode 1 allows for the manipulation of light objects that have minimal effect on the shape of the membrane. One can evaluate the actuator's workspace by altering clutch configurations in Mode 1. One can induce motion along cardinal directions by activating a single outboard clutch and the inboard clutch, and ordinal directions by activating the two adjacent outboard clutches and the inboard clutch. One can monitor ball position in three dimensions via Vicon cameras while inflating the membrane from 0 to 1.7 kPa in separate trials for each cardinal and ordinal direction. The actuator displaces the ball between 6 and 12 mm along each degree of freedom as displayed in FIG. 5A, this represents up to 16% of the 75 mm radius. The fifth and final degree of freedom, 'Up', results from no clutches active and is in the z plane, perpendicular to the plot in FIG. 5A. After the membrane is inflated to the desired pressure, one can deactivate the inboard clutch, which causes the restrained membrane to rapidly pressurize and impart a force onto the ball. FIG. 5B shows subsequent projectile motion that appears as parabolas beginning at the edge of the actuator workspace. Positions are plotted at 0.01 second intervals. Sparser data indicates faster motion induced by clutch deactivation.

One can characterize force output separately from workspace. In this characterization, the membrane was inflated to 2.8 kPa for cardinal directions (and 'Up') and 1.7 kPa for ordinal directions. Clutches were subject to failure at pressures higher than this. The central clutch was then deactivated, causing the same force response discussed for FIG. 5B. Force was calculated based on the motion of the ball as follows: the components of acceleration were calculated for the ball in each direction (x,y,z) from the second derivative of its position with respect to time and identified the instantaneous acceleration most relevant to the actuator force. The z component of acceleration was adjusted by summing it with the acceleration due to gravity. The magnitude of force was calculated as the product of the mass of the ball and the L2-norm of the three components of acceleration. Five trials were conducted for each direction, and the averages and standard deviations of force magnitudes are reported in Table I.

The direction of force was analyzed by calculating the unit vector associated with the average force applied in each DoF. The dot product was taken of this average unit vector and the unit vector associated with each trial to solve for the directional consistency of that trial on a scale of ~1 (complete opposite direction) to 1 (identical direction). The average of these scalar values for the five trials is reported as a percentage in Table I, where a dot product of 1 represents 100% consistency. In every trial, the primary component of force is in the upward direction.

TABLE I

Forces, Standard Deviations, and Average Directional Consistencies for Each DoF and Direction.

| DoF | Direction | Force (N) | Std (N) | Consistency (%) |
|---|---|---|---|---|
| DoF 1 | Back-Right | 1.2 | 0.21 | 99.3 |
| | Front-Left | 1.4 | 0.28 | 99.5 |
| DoF 2 | Front-Right | 1.1 | 0.41 | 99.8 |
| | Back-Left | 1.4 | 0.19 | 99.4 |
| DoF 3 | Front | 2.4 | 0.35 | 99.4 |
| | Back | 2.7 | 0.72 | 98.1 |
| DoF 4 | Left | 3.2 | 0.57 | 99.6 |
| | Right | 2.2 | 0.71 | 99.3 |
| DoF 5 | Up | 2.8 | 1.1 | 99.8 |

Figure 6A:
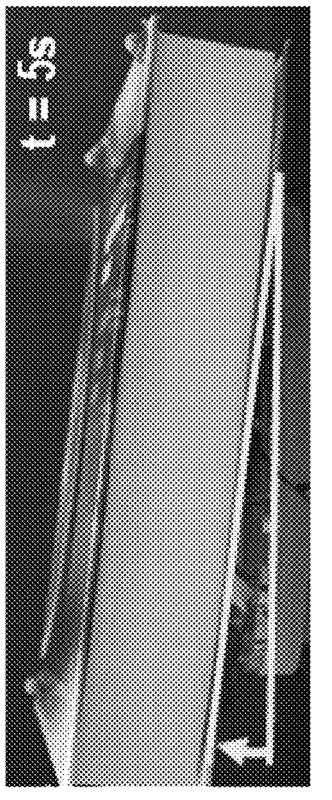
Figure 6B:
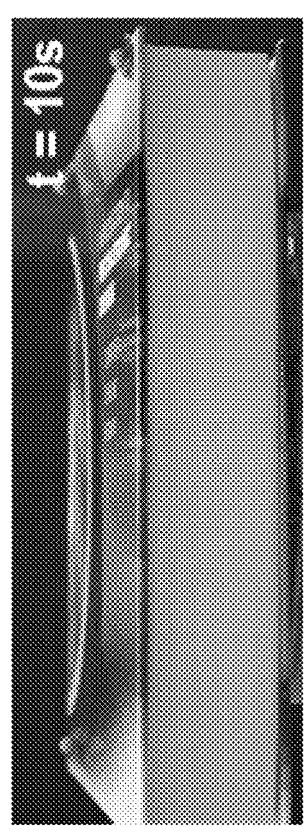

Mode 2: Mode 2 allows for the manipulation of heavier objects that alter the shape profile of the membrane. The actuator was inflated to 3.1 kPa with the right actuator active to bring the roll angle of the textbook to 5 degrees (FIG. 6A). The EA clutch was subsequently deactivated to ultimately return the roll angle to approximately zero (FIG. 6B). Vicon data displays the textbook's roll angle versus time in FIG. 6C, with inflation leading to a gradual increase in roll angle and clutch deactivation leading to a rapid decline in roll angle and an underdamped return to equilibrium.

Discussion of Results

All three simulated shapes were validated with high accuracy using the proposed experimental setup. The plateau shape represents local areas of negative Gaussian curvature and the round shape represents positive Gaussian curvature. The combinations of these different curvatures allow a range of different positions within the actuator workspace of up to 12 mm along various degrees of freedom. Different combinations of membrane and clutch layouts could be fabricated to reach myriad different shapes and motions.

Discrepancies between experimental and simulation results occur primarily at clutch-restricted regions. Without being bound to any particular theory or embodiment, these discrepancies could be due to the model's assumption that the clutch plates are fully overlapped at activation, and that no slipping occurs between activated clutch plates at any point during inflation. Nonlinear behavior of the Soft N' Shear stiffening agent is ignored in the simulation, which could also contribute to discrepancies. The close correlation between the modeled and experimental results shows promise for the use of FEM with EA clutch placement on a soft membrane.

The ability to induce projectile motion of the 3.7 g ball during Mode 1 manipulation shows that this actuator is capable of rapid directional force application at the edges of its workspace. Without any reconfiguration, the actuator can then actuate in Mode 2 to position the 820 g textbook pneumatically and rapidly reposition it with clutch deactivation. These results show that this shape-morphing actuator is an excellent option for versatile manners of force application along its five degrees of freedom (DoF).

Figure 7:
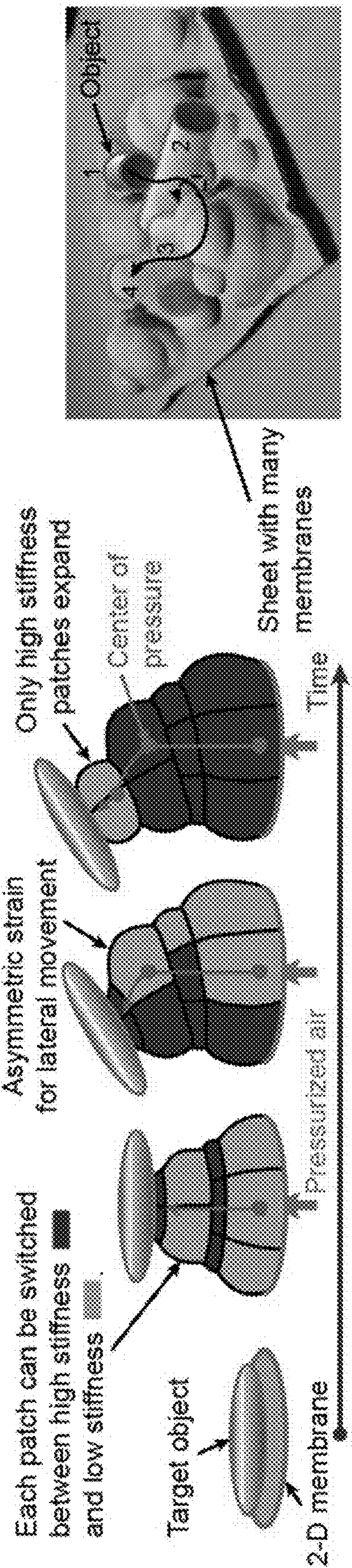
FIG. 7 provides (left) an illustration of an example actuator according to the present disclosure, showing the ability to manipulate the actuator into an asymmetric configuration and (right) an actuator that includes multiple membranes and related EA clutches, which actuator can be configured to move an object among positions 1, 2, 3, and 4 along the actuator.
Figure 8A:
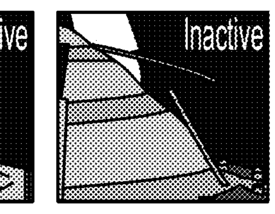
FIG. 8 provides illustrations of exemplary, non-limiting embodiments of the disclosed technology.
Figure 8A:
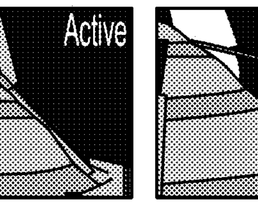
Figure 8A:
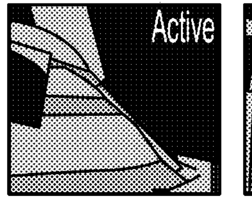
Figure 8B:
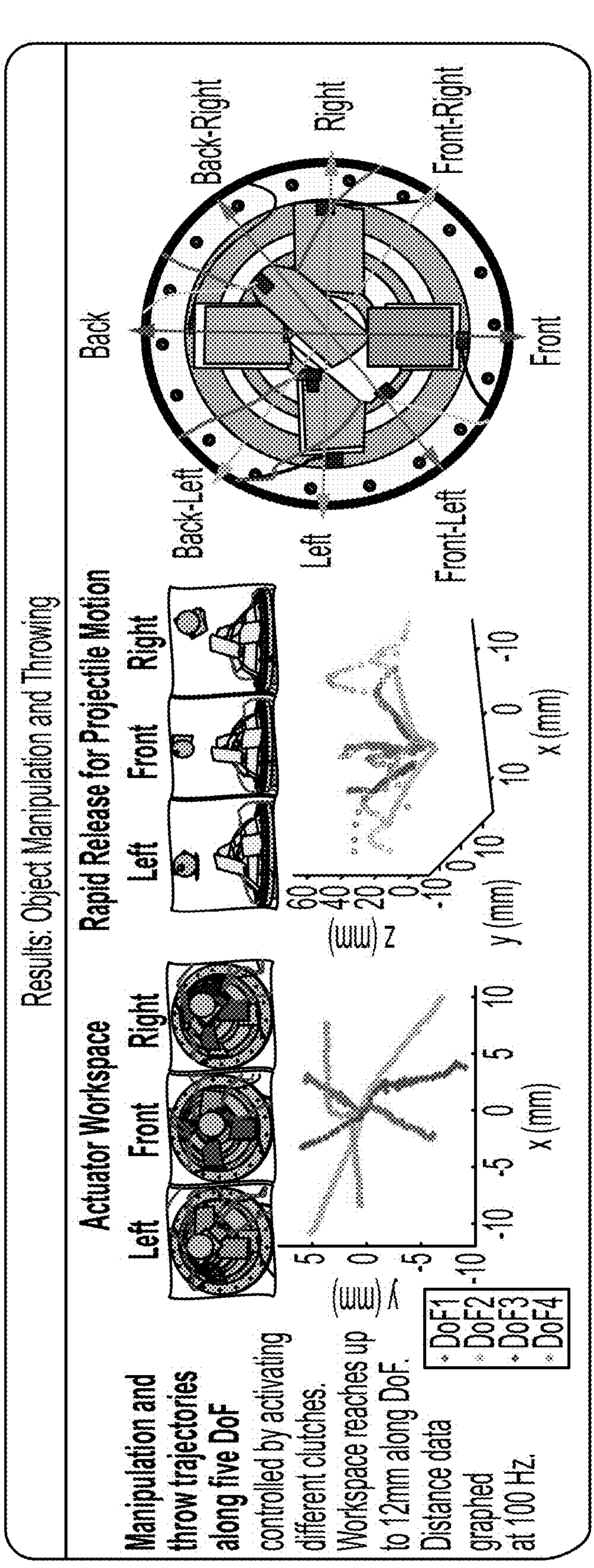

Additional example applications are shown in FIG. 7. As shown (left), an actuator can be inflated so as to achieve a lateral movement (by actuation of the various patches/EA clutches of the actuator), which in turn permits the controllable movement of a target object in a variety of different directions. Also as shown (right), an actuator can include a number of deformable membranes, which deformable membranes can be actuated to move an object along a selected path, for example, among locations 1, 2, 3, and 4. The movement of an object can be modulated by a detection system, which detection system can include tactile sensors, which tactile sensors can detect the location of the object by monitoring a force on the membrane on which the object rests; the location can then be used as an input (in a control system) to control the actuation of the EA clutches of the actuator.

A detection system can also be a visual detection system, which can use a camera or other imager to determine the location and/or direction of the object, which location and/or direction can be used as inputs (in a control system) to control the actuation of the EA clutches of the actuator.

FIG. 8 provides illustrations of exemplary, non-limiting embodiments of the disclosed technology.

CONCLUSIONS

This disclosure establishes EA clutches as a viable means of stiffness modulation for inflatable soft actuators. Furthermore, this disclosure shows that one can use clutches to alter the inflation of a single soft membrane to accurately recreate three target shapes and manipulate both light and heavy objects along five degrees of freedom while supplying air only from a small, low-voltage, DC pump. A light object manipulation workspace is defined for the actuator, and forces are characterized at the edges of this workspace. The disclosed technology thus provides a mechanism for powerful, soft manipulation.

REFERENCES

[1] G. Robinson and J. B. C. Davies, "Continuum robots-a state of the art," in Proceedings 1999 IEEE international conference on robotics and automation (Cat. No. 99CH36288C), vol. 4. IEEE, 1999, pp. 2849-2854.

[2] A. Pettersson, S. Davis, J. O. Gray, T. J. Dodd, and T. Ohlsson, "Design of a magnetorheological robot gripper for handling of delicate food products with varying shapes," Journal of Food Engineering, vol. 98, no. 3, pp. 332-338, 2010.

[3] T. Tolley Michael, F. Shepherd Robert, C. Galloway Kevin, J. Wood Robert, M. Whitesides George et al., "A resilient, untethered soft robot," Soft robotics, 2014.

[4] C. Laschi, B. Mazzolai, and M. Cianchetti, "Soft robotics: Technologies and systems pushing the boundaries of robot abilities," Sci. Robot, vol. 1, no. 1, p. eaah3690, 2016.

[5] J. Yin, R. Hinchet, H. Shea, and C. Majidi, "Wearable soft technologies for haptic sensing and feedback," Advanced Functional Materials, p. 2007428, 2020.

[6] R. F. Shepherd, F. Ilievski, W. Choi, S. A. Morin, A. A. Stokes, A. D. Mazzeo, X. Chen, M. Wang, and G. M. Whitesides, "Multigait soft robot," Proceedings of the national academy of sciences, vol. 108, no. 51, pp. 20 400-20 403, 2011.

[7] B. Mosadegh, P. Polygerinos, C. Keplinger, S. Wennstedt, R. F. Shepherd, U. Gupta, J. Shim, K. Bertoldi, C. J. Walsh, and G. M. Whitesides, "Pneumatic networks for soft robotics that actuate rapidly," Advanced functional materials, vol. 24, no. 15, pp. 2163-2170, 2014.

[8] J. Pikul, S. Li, H. Bai, R. Hanlon, I. Cohen, and R. Shepherd, "Stretchable surfaces with programmable 3d texture morphing for synthetic camouflaging skins," Science, vol. 358, no. 6360, pp. 210-214, 2017.

[9] N. Sholl, A. Moss, M. Krieg, and K. Mohseni, "Controlling the deformation space of soft membranes using fiber reinforcement," The International Journal of Robotics Research, vol. 40, no. 1, pp. 178-196, 2021.

[10] R. Balak and Y. C. Mazumdar, "Multi-modal pneumatic actuator for twisting, extension, and bending," in 2020 IEEE/RSJ International Conference on Intelligent Robots and Systems (IROS). IEEE, 2020, pp. 8673-8679.

[11] E. Steltz, A. Mozeika, N. Rodenberg, E. Brown, and H. M. Jaeger, "Jsel: Jamming skin enabled locomotion," in 2009 IEEE/RSJ International Conference on Intelligent Robots and Systems. IEEE, 2009, pp. 5672-5677.

[12] A. Firouzeh, M. Salerno, and J. Paik, "Soft pneumatic actuator with adjustable stiffness layers for multi-dof actuation," in 2015 IEEE/RSJ International Conference on Intelligent Robots and Systems (IROS). IEEE, 2015, pp. 1117-1124.

[13] D. J. Levine, K. T. Turner, and J. H. Pikul, "Materials with electro-programmable stiffness," Advanced Materials, p. 2007952, 2021.

[14] H. Imamura, K. Kadooka, and M. Taya, "A variable stiffness dielectric elastomer actuator based on electrostatic chucking," Soft matter, vol. 13, no. 18, pp. 3440-3448, 2017.

[15] Z. Zou, T. Li, S. Qu, and H. Yu, "Active Shape Control and Phase Coexistence of Dielectric Elastomer Membrane With Patterned Electrodes," Journal of Applied Mechanics, vol. 81, no. 3, 10 2013, 031016. [Online]. Available: https://doi.org/10.1115/1.4025416

[16] R. Hinchet and H. Shea, "High force density textile electrostatic clutch," Advanced Materials Technologies, vol. 5, no. 4, p. 1900895, 2020.

[17] R. Hinchet, V. Vechev, H. Shea, and O. Hilliges, "Dextres: Wearable haptic feedback for grasping in vr via a thin form-factor electrostatic brake," in Proceedings of the 31st Annual ACM Symposium on User Interface Software and Technology, 2018, pp. 901-912.

[18] S. B. Diller, S. H. Collins, and C. Majidi, "The effects of electroadhesive clutch design parameters on performance characteristics," Journal of Intelligent Material Systems and Structures, vol. 29, no. 19, pp. 3804-3828, 2018.

[19] S. Diller, C. Majidi, and S. H. Collins, "A lightweight, low-power electroadhesive clutch and spring for exoskeleton actuation," in 2016 IEEE International Conference on Robotics and Automation (ICRA). IEEE, 2016, pp. 682-689.

[20] J. Guo, C. Xiang, and J. Rossiter, "A soft and shape-adaptive electroadhesive composite gripper with proprioceptive and exteroceptive capabilities," Materials & Design, vol. 156, pp. 586-587, 2018.

[21] J. Germann, M. Dommer, R. Pericet-Camara, and D. Floreano, "Active connection mechanism for soft modular robots," Advanced Robotics, vol. 26, no. 7, pp. 785-798, 2012.

[22] A. Alspach, K. Hashimoto, N. Kuppuswamy, and R. Tedrake, "Soft-bubble: A highly compliant dense geometry tactile sensor for robot manipulation," in 2019 2nd IEEE International Conference on Soft Robotics (RoboSoft). IEEE, 2019, pp. 597-604.

[23] R. Hinchet and H. Shea, "High force density textile electrostatic clutch," Advanced Materials Technologies, vol. 5, no. 4, p. 1900895, 2019.

[24] D. Systèmes, "Abaqus," https://www.3ds.com/products-services/simulia/products/abaqus/, 2020/Standard.

[25] S. R. Toolkit, "Demo 1: Multi-chamber bending spa," https://softroboticstoolkit.com/book/modeling-soft-pneumatic-actuators/modeling/demo-1.

[26] D. Girardeau-Montaut, "Cloudcompare," France: EDF R&D Telecom ParisTech, 2016.

Aspects

The following Aspects are illustrative only and do not limit the scope of the present disclosure or the appended claims. Any part or parts of any one or more Aspects can be combined with any part or parts of any one or more other Aspects.

Aspect 1. A soft actuator, comprising: a deformable member having a base stiffness; one or more electroadhesive (EA) clutches, the one or more EA clutches being in mechanical communication with the deformable member, and the one or more EA clutches being configured to, when actuated, give rise to a region of relative stiffness within the actuator that is greater than the base stiffness.

Aspect 2. The soft actuator of Aspect 1, further comprising a chamber, the chamber being at least partially bounded by the deformable member.

Aspect 3. The soft actuator of any one of Aspects 1-2, wherein the deformable member is convertible, by application of a pressure, between at least a resting state and an actuated state.

Aspect 4. The soft actuator of Aspect 3, wherein the actuated state defines one or more isolated regions of expansion, the one or more regions optionally comprising a plurality of tiers.

Aspect 5. The soft actuator of any one of Aspects 1-4, wherein the deformable member is at least one of a membrane, a curved member that resists straightening, or a straight member that resists bending. A membrane can be, for example, an elastomer. A curved member can be, for example, a shape-memory material. The deformable member can comprise metal, polymer (thermoplastic and/or thermoset), or any combination thereof. Without being bound to any particular theory or embodiment, membranes are considered particularly suitable deformable members.

Aspect 6. The soft actuator of any one of Aspects 1-5, wherein the region of relative stiffness restrains expansion of a region of the deformable member.

Aspect 7. The soft actuator of any one of Aspects 1-6, wherein the one or more EA clutches comprise a plurality of individually addressable EA clutches. As but one example, a soft actuator can include two clutches arranged perpendicular to each other, with each clutch being individually controllable.

Aspect 8. The soft actuator of Aspect 7, wherein the plurality of individually addressable EA clutches are arranged substantially symmetrically.

Aspect 9. The soft actuator of Aspect 7, wherein the plurality of individually addressable EA clutches are arranged substantially asymmetrically.

Aspect 10. The soft actuator of any one of Aspects 1-9, further comprising an inflation train configured to apply a pressure on the deformable member.

Aspect 11. The soft actuator of Aspect 10, wherein the inflation train comprises a pump.

Aspect 12. The soft actuator of any one of Aspects 1-11, wherein the one or more EA clutches is configured such that when at least one EA is actuated, the deformable member achieves an asymmetric shape when a pressure is exerted against the deformable member.

Aspect 13. The soft actuator of any one of Aspects 1-11, wherein the one or more EA clutches is configured such that when at least one EA is actuated, the deformable member achieves a symmetric shape when a pressure is exerted against the deformable member.

Aspect 14. The soft actuator of any one of Aspects 1-12, wherein the one or more EA clutches are arranged such that (1) when the one or more EA clutches are actuated in a first pattern and a pressure is exerted against the deformable member, the deformable member achieves a first shape, and (2) when the one or more EA clutches are actuated in a second pattern and a pressure is exerted against the deformable member, the deformable member achieves a second shape, which second shape differs from the first shape. Such an embodiment is provided in non-limiting FIGS. 1A-1D, which figures (and related description) illustrate how activation of different clutches (or sets of clutches) on the deformable member can give rise to different final shapes.

Aspect 15. A method, comprising operating a soft actuator according to any one of Aspects 1-14.

Aspect 16. The method of Aspect 15, wherein the operating is performed so as to encourage an object off of the soft actuator.

Aspect 17. The method of Aspect 15, wherein the operating is performed so as to encourage an object along the soft actuator.

Aspect 18. A method, comprising: in a soft actuator, actuating one or more EA clutches in mechanical communication with a deformable member having a base stiffness, the actuating being performed so as to give rise to one or more regions of relative stiffness within the soft actuator that is greater than the base stiffness; and effecting a bending force within the deformable member such that the deformable member attains a shape, the shape at least partially defined by the actuated one or more EA clutches.

Aspect 19. The method of Aspect 18, comprising (1) actuating the one or more EA clutches according to a first pattern such that the deformable member achieves a first shape in response to the bending force, and (2) actuating the one or more EA clutches according to a second pattern such that the deformable member achieves a second shape in response to the bending force, which second shape differs from the first shape.

Aspect 20. The method of Aspect 18, wherein the bending force is effected by inflating the deformable member.

Aspect 21. The method of any one of Aspects 18-20, wherein the method is performed so as to effect expansion of the deformable member along at least two axes.

Aspect 22. The method of any one of Aspects 18-21, wherein the method is performed such that the deformable member achieves a nonsymmetric shape.

Aspect 23. The method of any one of Aspects 18-21, wherein the method is performed such that the deformable member achieves a symmetric shape.

Aspect 24. The method of any one of Aspects 18-23, wherein the method is performed so as to encourage an object off of the soft actuator (for example, as shown in FIG. 5B and related description), so as to encourage an object along the soft actuator (for example, as shown in FIG. 7 (right panel), or both.

Aspect 25. The method of any one of Aspects 18-24, wherein the actuating releases an EA clutch so as to release a portion of the deformable member in register with the EA clutch. This can be seen in FIG. 5B (and related description), which illustrate that turning off an EA clutch engaged with a pressurized membrane results in rapid expansion of the membrane at the location of the deactivated EA clutch.

What is claimed:

1. A soft actuator, comprising:

a deformable member having a base stiffness; and one or more electroadhesive (EA) clutches, each EA clutch comprising a first electrode and a second electrode, each EA clutch being operable such that the first electrode and the second electrode associate against one another when the EA clutch is placed in an activated state, the first electrode and the second electrode of the EA clutch both being superposed on a same surface of the deformable member, the one or more EA clutches being in mechanical communication with the deformable member, and the one or more EA clutches being configured to, when actuated, give rise to a region of relative stiffness within the soft actuator that is greater than the base stiffness.

2. The soft actuator of claim 1, further comprising a chamber, the chamber being at least partially bounded by the deformable member.

3. The soft actuator of claim 1, wherein the deformable member is convertible, by application of a pressure, between at least a resting state and an actuated state.

4. The soft actuator of claim 3, wherein the actuated state defines one or more isolated regions of expansion.

5. The soft actuator of claim 1, wherein the deformable member is at least one of a membrane, a curved member that resists straightening, or a straight member that resists bending.

6. The soft actuator of claim 1, wherein the region of relative stiffness restrains expansion of a region of the deformable member.

7. The soft actuator of claim 1, wherein the one or more EA clutches comprise a plurality of individually addressable EA clutches.

8. The soft actuator of claim 7, wherein the plurality of individually addressable EA clutches are arranged substantially symmetrically.

9. The soft actuator of claim 7, wherein the plurality of individually addressable EA clutches are arranged substantially asymmetrically.

10. The soft actuator of claim 1, further comprising an inflation train configured to apply a pressure on the deformable member.

11. The soft actuator of claim 10, wherein the inflation train comprises a pump.

12. The soft actuator of claim 1, wherein the one or more EA clutches is configured such that when at least one EA clutch is actuated, the deformable member achieves an asymmetric shape when a pressure is exerted against the deformable member.

13. The soft actuator of claim 1, wherein the one or more EA clutches is configured such that when at least one EA is actuated, the deformable member achieves a symmetric shape when a pressure is exerted against the deformable member.

14. The soft actuator of claim 1, wherein the one or more EA clutches are arranged such that (1) when the one or more EA clutches are actuated in a first pattern and a pressure is exerted against the deformable member, the deformable member achieves a first shape, and (2) when the one or more EA clutches are actuated in a second pattern and a pressure is exerted against the deformable member, the deformable member achieves a second shape, which second shape differs from the first shape.

15. A method, comprising operating a soft actuator according to claim 1.

16. The method of claim 15, wherein the operating is performed so as to encourage an object off of the soft actuator.

17. The method of claim 15, wherein the operating is performed so as to encourage an object along the soft actuator.

18. A method, comprising:

in a soft actuator, actuating one or more EA clutches in mechanical communication with a deformable member having a base stiffness, each EA clutch comprising a first electrode and a second electrode, each EA clutch being operable such that the first electrode and the second electrode associate against one another when the EA clutch is placed in an activated state the first electrode and the second electrode of the EA clutch both being superposed on a same surface of the deformable member, the actuating being performed so as to give rise to one or more regions of relative stiffness within the soft actuator that is greater than the base stiffness; and effecting a bending force within the deformable member such that the deformable member attains a shape, the shape at least partially defined by the actuated one or more EA clutches.

19. The method of claim 18, comprising (1) actuating the one or more EA clutches according to a first pattern such that the deformable member achieves a first shape in response to the bending force, and (2) actuating the one or more EA clutches according to a second pattern such that the deformable member achieves a second shape in response to the bending force, which second shape differs from the first shape.

20. The method of claim 18, wherein the bending force is effected by inflating the deformable member.

21. The method of claim 18, wherein the method is performed so as to effect expansion of the deformable member along at least two axes.

22. The method of claim 18, wherein the method is performed such that the deformable member achieves a nonsymmetric shape.

23. The method of claim 18, wherein the method is performed such that the deformable member achieves a symmetric shape.

24. The method of claim 18, wherein the method is performed so as to encourage an object off of the soft actuator, so as to encourage an object along the soft actuator, or both.

25. The method of claim 18, wherein the actuating releases an EA clutch so as to release a portion of the deformable member in register with the EA clutch.

26. The soft actuator of claim 4, wherein the one or more isolated regions of expansion comprises a plurality of tiers.

* * * * *